(12) United States Patent
Schnieder

(10) Patent No.: US 9,398,755 B2
(45) Date of Patent: Jul. 26, 2016

(54) PET GARMENT

(71) Applicant: Elizabeth E Schnieder, Bonnyville, CA (US)

(72) Inventor: Elizabeth E Schnieder, Bonnyville, CA (US)

(*) Notice: Subject to any disclaimer, the term of this patent is extended or adjusted under 35 U.S.C. 154(b) by 0 days.

(21) Appl. No.: 14/923,416

(22) Filed: Oct. 26, 2015

(65) Prior Publication Data

US 2016/0044895 A1  Feb. 18, 2016

Related U.S. Application Data

(63) Continuation-in-part of application No. 13/967,032, filed on Aug. 14, 2013, now abandoned.

(51) Int. Cl.
*A01K 13/00* (2006.01)
*A62B 35/00* (2006.01)

(52) U.S. Cl.
CPC .............. *A01K 13/006* (2013.01); *A01K 13/007* (2013.01)

(58) Field of Classification Search
USPC ......... 119/850, 863, 792, 793, 857, 856, 868, 119/907, 725, 726, 814, 816, 818, 858, 119/714; D30/151, 152, 149, 144, 145, D30/146; 54/79.1–79.4; 36/111
See application file for complete search history.

(56) References Cited

U.S. PATENT DOCUMENTS

| | | | |
|---|---|---|---|
| 2,222,705 A * | 11/1940 | Conlon | 54/79.1 |
| 3,150,641 A * | 9/1964 | Kesh | 119/678 |
| 4,796,567 A * | 1/1989 | Allan et al. | 119/678 |
| 5,447,124 A * | 9/1995 | Pollock et al. | 119/850 |
| 6,820,574 B2 * | 11/2004 | Sharpe | 119/820 |
| 7,637,087 B1 * | 12/2009 | Graham | 54/79.2 |
| D615,252 S * | 5/2010 | Nunes-Freitas et al. | D30/145 |
| 2006/0060155 A1 * | 3/2006 | Ip | 119/850 |
| 2007/0193532 A1 * | 8/2007 | Shelton | 119/850 |
| 2010/0313825 A1 * | 12/2010 | Friedland | 119/850 |
| 2014/0053790 A1 * | 2/2014 | Rumps | 119/850 |

* cited by examiner

*Primary Examiner* — Andrea Valenti
(74) *Attorney, Agent, or Firm* — MCQIPLAW; Jeffrey McQuiston

(57) ABSTRACT

The present disclosure pertains to a dog garment comprising: a) a torso portion that substantially covers a back and lateral sides of a torso of a dog, wherein the torso portion has an underbelly torso opening and a hind opening; b) a neck portion extending from the torso portion and arranged to encase the neck of the dog, wherein the neck portion comprises a neck portion fastener for securing the neck portion; c) front leg portions extending from the torso portion, wherein the front leg portions encase front legs of the dog; d) hind leg portions extending from the torso portion, wherein the hind leg portions encase hind legs of the dog; e) a foot portion at each of a terminal end of the front leg portions and the hind leg portions; and f) size adjustment portions.

16 Claims, 4 Drawing Sheets

PET GARMENT

CROSS REFERENCE TO RELATED APPLICATION

This application is a continuation-in-part of applicant's co-pending application Ser. No. 13/967,032, filed Aug. 14, 2013, the entire contents of which is hereby expressly incorporated by reference herein.

FIELD OF THE INVENTION

The present disclosure is in the field of adjustable dog garments that pertains to protecting a dog from inclement weather while allowing unrestricted movement.

BACKGROUND OF THE DISCLOSURE

Many people who own dogs live in geographical regions that experience long, cold winters where daytime high temperatures often stay below well below freezing (i.e., 0° C.) for weeks or months at a time. Despite such freezing temperatures the dogs must be allowed outdoors several times a day to relieve themselves. This presents significant problems, particularly when the ground is covered in ice, snow or slush, because the dog's pads get very cold and can become embedded with marble-sized pieces of ice. Consequently, the dog may be reluctant to go outside, and when outside, may seek to re-enter the home before relieving itself. Further, once the dog re-enters the home, its paws must be dried and any pieces of ice embedded in its pads must be removed. This is a laborious process for the dog owner, and causes the dog significant discomfort.

Dog-owners who live in geographical regions that experience extremely hot temperatures encounter a similar, if less serious, problem. On days with particularly high temperatures, for example, above about 30° C., walking surfaces may become too hot for the dog's pads, thereby preventing the dog-owner from taking the dog for a walk.

U.S. patent publication 20070193532 describes a dog's apparel that is intended for indoor use. The apparel encloses the body of a dog to protect homes and vehicles against undesirable debris located on or about the body of the animal. The apparel is not intended to protect the dog, or its pads, from inclement weather. Instead, it is used so as to prevent dander, mud, dirt, water and other materials commonly found on a dog's body from being transferred to an individual's home, auto or area that is to be kept clean.

U.S. patent publication 2008115738 (the '738 publication) describes an animal coat for protecting the animal from inclement weather, particularly cold weather. The coat is said to include an improved means for securing the coat to the animal. However, because the coat is not intended to protect a dog's pads from cold or hot surfaces, the coat described in the '738 publication does not enclose the animal's feet.

U.S. Pat. No. 6,024,055 (the '055 patent) describes a pullover dog sweater that fully encloses the torso portion of the dog's body and the dog's legs and feet. The sweater is made of a knit material and, because it is a pullover sweater, lacks a closure means in the neck portion. It therefore is placed on the dog by slipping the neck portion over the dog's head. In addition to lacking a closure means in the neck portion, the pullover sweater described in the '055 patent lacks a leash attachment opening.

U.S. Pat. No. 3,742,679 (the '679 patent) describes a stretchable pet suit with boots. The pet suit has elasticized strips along the legs, which are detachably connected to the boots with elastic straps and fasteners. Because the boots are detachably couple to the legs, the pet suit of the '679 patent has the advantage of allowing the owner to utilize only the torso portion when providing the animal when protection for its feet is unnecessary. On the other hand, for the same reason, when protecting the animal's feet is desired the suit is less convenient because placing the suit on the animal becomes a multi-step process. That is, after placing the main portion of the suit on the animal each of the boots must be affixed to a leg of the suit. This pet suit lacks a closure means in the neck portion, and is instead secured to the animal via a zipper running along the back portion. The neck portion also does not have a leash attachment opening.

Thus, there exists a continuing need for a convenient dog garment that is well suited for protecting a dog from inclement weather while simultaneously protecting the dog's pads from cold surfaces, such as snow and ice, as well as for protecting the dog's pads from hot surfaces, such as hot asphalt. The present invention substantially fulfills this need.

SUMMARY OF THE INVENTION

A dog garment comprising: a) a torso portion that substantially covers a back and lateral sides of a torso of a dog, wherein the torso portion has an underbelly torso opening and a hind opening; b) a neck portion extending from said torso portion and arranged to encase the neck of the dog, wherein the neck portion comprises a neck portion fastener for securing the neck portion; c) front leg portions extending from the torso portion, wherein the front leg portions encase front legs of the dog; d) hind leg portions extending from said torso portion, wherein the hind leg portions encase hind legs of the dog; e) a foot portion at each of a terminal end of the front leg portions and the hind leg portions; and f) size adjustment portions comprising a front leg elastic drawstring cord and a hind leg elastic drawstring cord.

DETAILED DESCRIPTION OF THE EMBODIMENTS

The following is a detailed description of certain specific embodiments of the dog garments disclosed herein. In this description reference is made to the drawings.

Definitions

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

Introduction

In one aspect, disclosed herein is a dog garment comprising: a) a torso portion that substantially covers a back and lateral sides of a torso of a dog, wherein the torso portion has an underbelly torso opening and a hind opening; b) a neck portion extending from said torso portion and arranged to encase the neck of the dog, wherein the neck portion comprises a neck portion fastener for securing the neck portion; c) front leg portions extending from the torso portion, wherein the front leg portions encase front legs of the dog; d) hind leg portions extending from said torso portion, wherein the hind leg portions encase hind legs of the dog; e) a foot portion at each of a terminal end of the front leg portions and the hind leg portions; and f) size adjustment portions comprising a front leg elastic drawstring cord and a hind leg elastic drawstring cord, wherein the front leg elastic drawstring cord and hind leg elastic drawstring cord are capable of being independently adjusted to accommodate dogs of different sizes.

Figure 1:
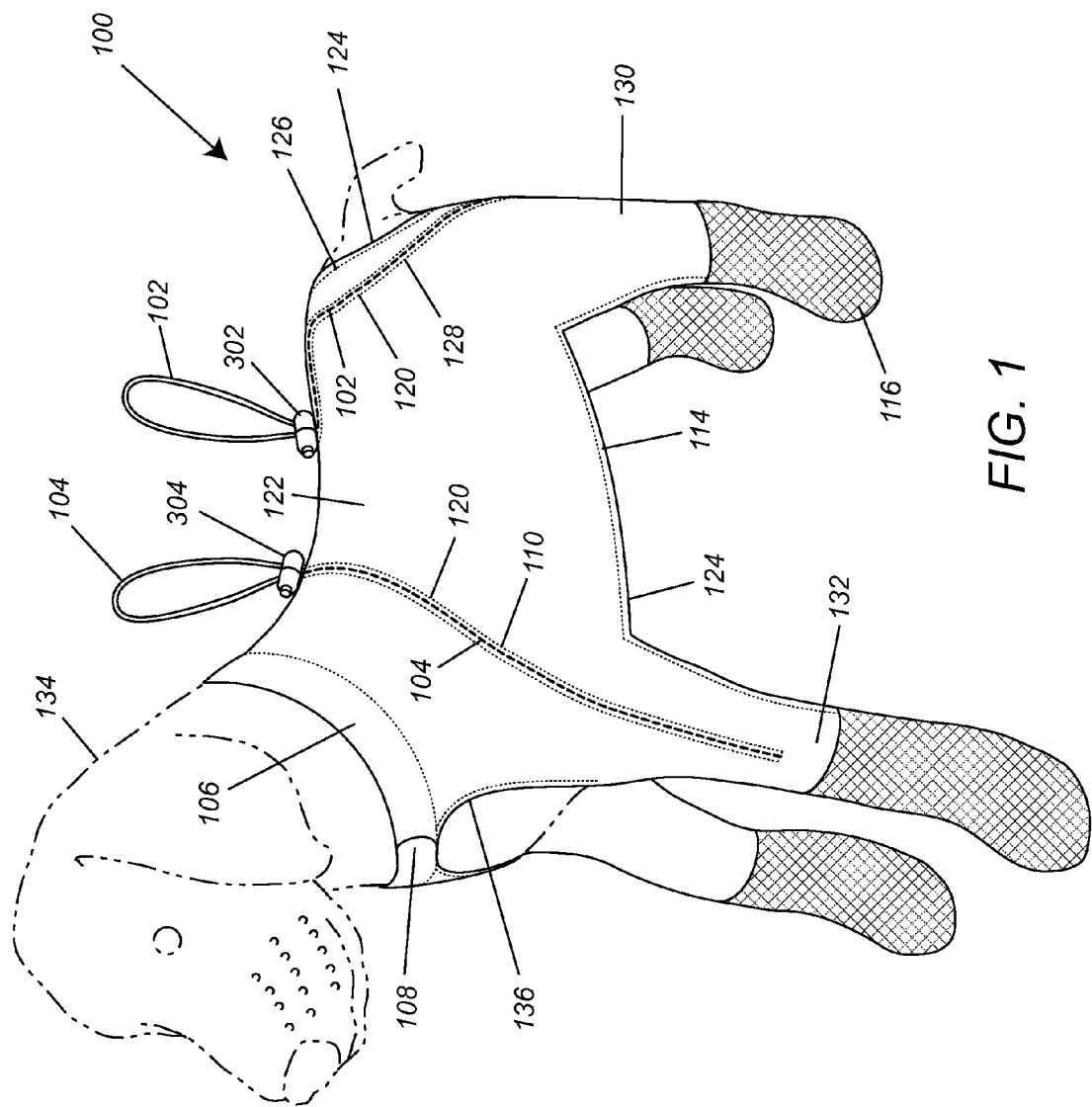
FIG. 1 is a side illustration of an embodiment of the dog garment 100 on a small dog 134.
Figure 2:
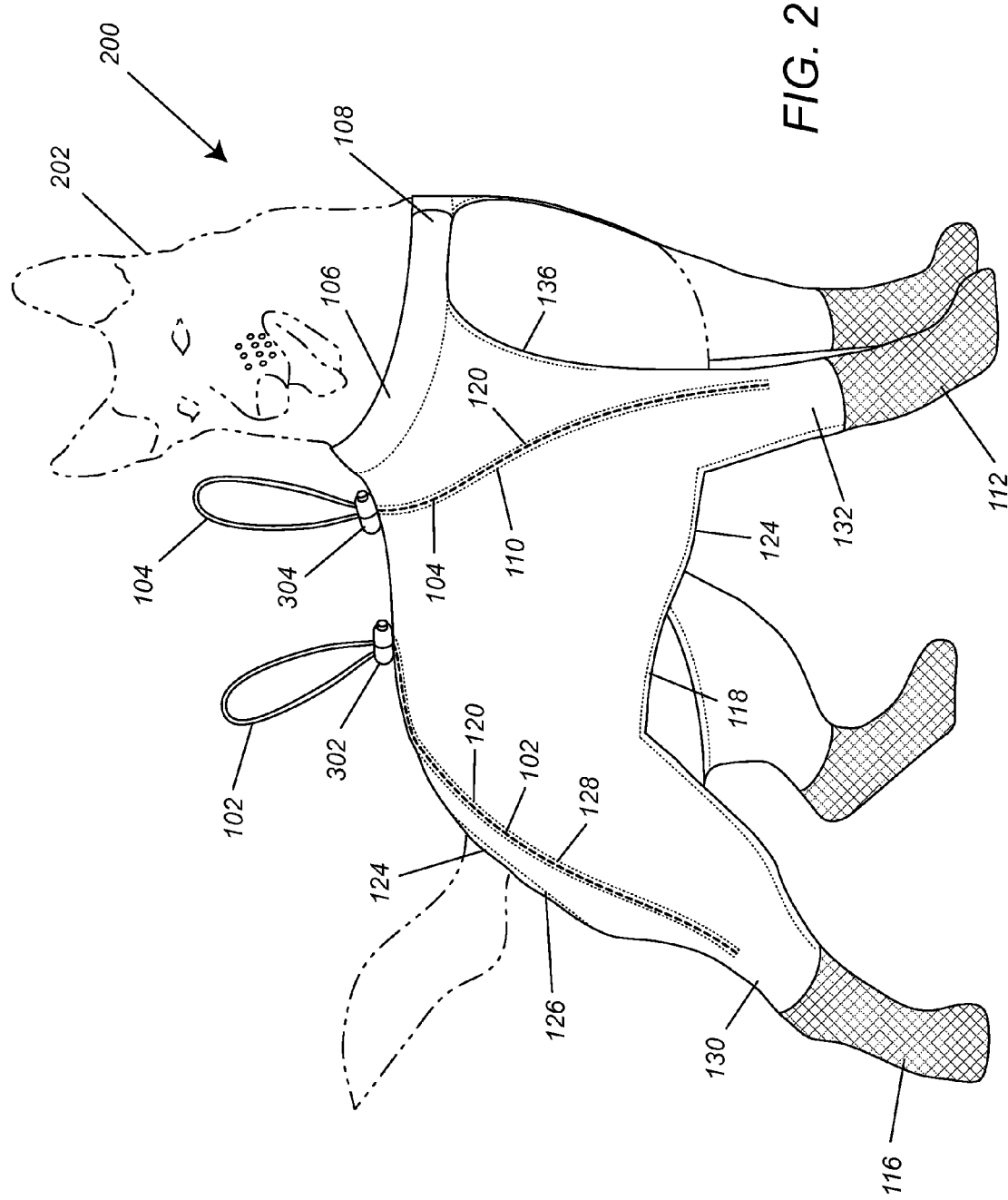
FIG. 2 is a side illustration of an embodiment of the dog garment 200 on a large dog 202.

Referring to the drawings, FIGS. 1 and 2 shows a small dog 134 and a large dog 202 wearing a small dog garment 100 and a large dog garment 200, respectively. In some embodiments, the garment may be designed to fit puppies, small dogs, medium sized dogs and large dogs. The small dog garment 100 and the large dog garment 200 cover every part of dogs 134 and 202, respectively, except the head, chest area, underbelly, hind end and tail. Dog garments 100 and 200 comprise a torso portion 122 with a left side 114 and a right side 118, which is contiguous with front leg portions 132 and hind leg portions 130. Torso portion 122 cover the lateral sides and back of each dog. Furthermore, the neck portion 106 of garments 100 and 200 covers part of a dog's neck. The tail of the dog is not covered by dog garments 100 and 200, and the tail is exposed along with hind end of the dog as depicted with the hind opening 126. Dog garments 100 and 200 also comprise a leash attachment opening 136 and closure means 108. In some embodiments, the dog garment further comprises a leash attachment opening located on the neck portion of the dog garment.

FIGS. 1 and 2 depict a view of dog garments 100 and 200, whereby the head of the dogs are exposed and not protected by the dog garments. As illustrated with FIGS. 1 and 2, the chest area of the dogs are also is not covered by dog garments 100 and 200. Closure means 136 connects each side of the neck portion 106, thereby securing dog garments 100 and 200 to dogs 134 and 202. In some embodiments, the neck portion 106 comprises an elastic material. Closure means 136 may be any mechanical fastener which facilitates connecting each side of the neck portion 106. In some embodiments, the fastener is a hook-and-loop fastener, a snap, a clip, a button or any combination thereof. In one embodiment, the closure means is a hook-and-loop fastener. In some embodiments, the neck portion fastener comprises a hook-and-loop fastener, a snap, a clip, a button or a combination thereof.

Dog garments 100 and 200 are comprised of a fabric, such as, for example, a fleece material that is waterproof and thermally insulating, thereby providing the dog with protection from inclement weather. Of course, certain fabrics may be better suited for protecting the dog, particularly the dog's pads, from cold surfaces, such as snow and ice, whereas other fabrics may be better suited for protecting the dog's pads from hot surfaces, such as hot asphalt. Still other fabrics may be better suited for protecting the dog from wet surfaces, such as wet concrete or asphalt, wet grass, puddles and marshy areas, or from rain, sleet or snow. Fleece has been found to be an especially suitable fabric for protecting the dog's body from snow and ice, and in preventing pieces of ice from becoming lodged within the dog's pads. Fleece also has the advantage of being machine washable and machine dryable, thereby greatly facilitating the process of cleaning the garment following its use. In some embodiments, the thermally insulating material is machine washable and dryable.

In certain instances it may be preferable that the garment be made from more than one type of fabric. For example, in hot environments the leg portions of the garment, or even simply the feet portions of the garment, may be made of fleece so as to provide the dog with protect against hot surfaces, such as hot asphalt, while the remainder of the garment may be made of a lighter mesh material that is less thermally insulating than fleece. Likewise, in certain instances it may be preferable that the garment be made of a fabric that is more waterproof than fleece, such as, for example, Goretex®. Such fabrics may be particularly suitable in environments where the main objective is to protect the dog from wet surfaces, such as wet concrete or asphalt, wet grass, puddles and marshy areas. In some embodiments, the thermally insulating, machine washable and dryable material is fleece. In some embodiments, the dog garment comprises one continuous piece of thermally insulating material. In some embodiments, the dog garments 100 and 200 comprise finished edges 124 along the edges of the garment.

Dog garments 100 and 200 also may contain elastic material to allow for stretching in front leg portions 132 and hind leg portions 130 to accommodate dogs of different sizes. In addition, garments 100 and 200 also may contain elastic material in the torso 122 to allow for stretching in that area as well.

Referring to the drawings, FIGS. 1-4 illustrate a front leg elastic drawstring cord 104 and a hind leg elastic drawstring cord 102. In some embodiments, the front leg elastic drawstring cord and hind leg elastic drawstring cord comprising an elastic rubber, wherein the terminal ends of each cord are fastened to the leg portions. The terminal ends of the front leg elastic drawstring cord 104 are connected to an inner side 400 of the dog garment with one or more stitches 306 and slideably encased in a left front leg drawstring tube 110 and a right front leg drawstring tube 312. The left front leg drawstring tube 110 and a right front leg drawstring tube 312 are fastened to an inner side 400 of the dog garment with stitching. In some embodiments, the left front leg drawstring tube 110 and a right front leg drawstring tube 312 are comprised of polyester, nylon, Goretex® or a combination thereof.

The terminal ends of the hind leg elastic drawstring cord 102 are connected to an inner side 400 of the dog garment with one or more stitches 306 and slideably encased in a left hind leg drawstring tube 128 and a right hind leg drawstring tube 314. The left hind leg drawstring tube 128 and a right hind leg drawstring tube 314 are fastened to an inner side 400 of the dog garment with stitching 120. In some embodiments, the left hind leg drawstring tube 128 and a right hind leg drawstring tube 314 are comprised of polyester, nylon, cotton, fleece, Goretex® or a combination thereof. In some embodiments, the front leg elastic drawstring cord and hind leg elastic drawstring cord comprising an elastic rubber, wherein the terminal ends of each cord are fastened to the leg portions, wherein the fastener comprises a staple, glue, stitching, or combinations thereof. In some embodiments, the dog garment further comprises that the front leg elastic drawstring cord and the hind leg elastic drawstring cord that is capable of stretching up to about 5 times their length and are capable of stretching the garment over a torso and legs of the dog.

Figure 3:
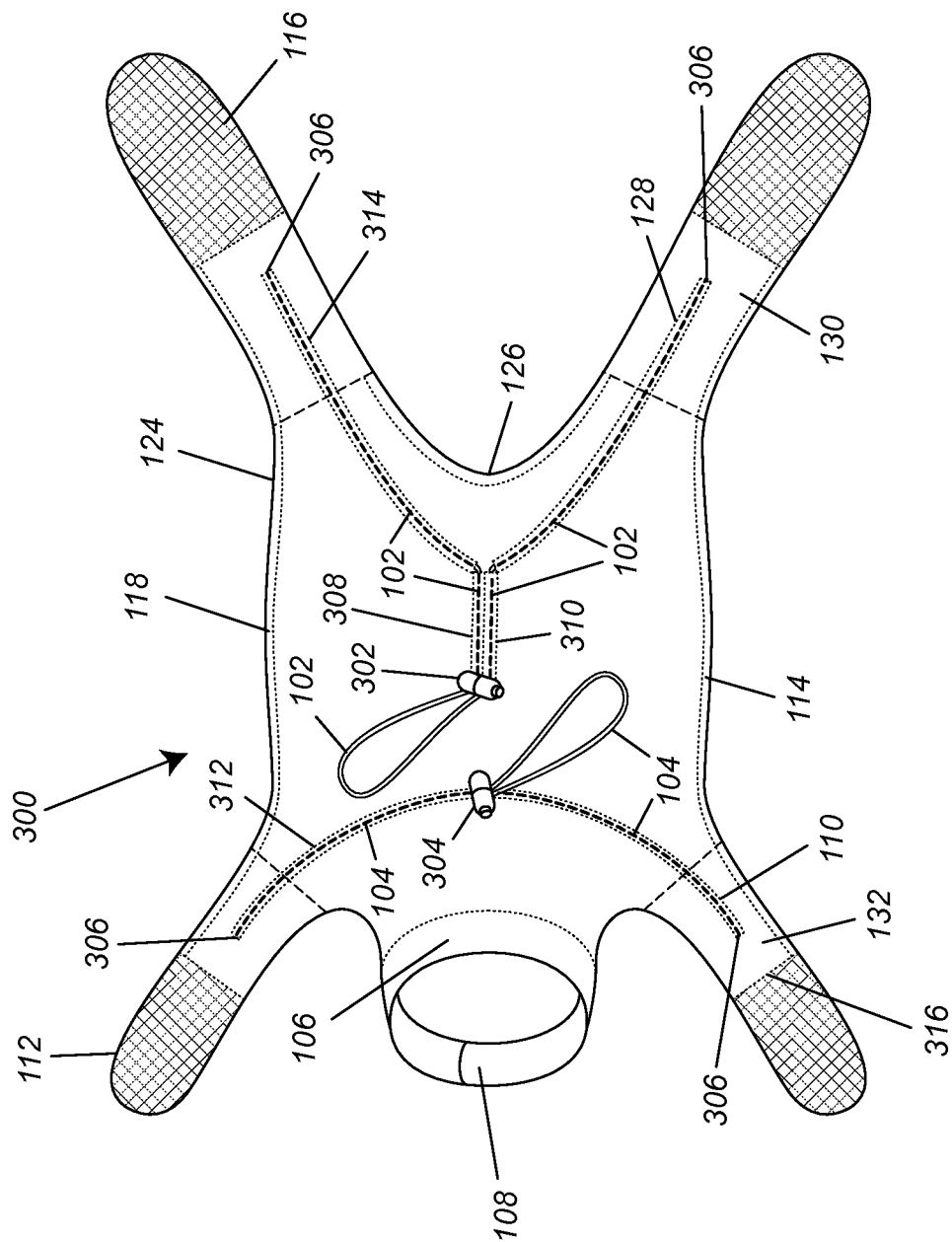
FIG. 3 is an illustration of an outside portion 300 of the dog garment.
Figure 4:
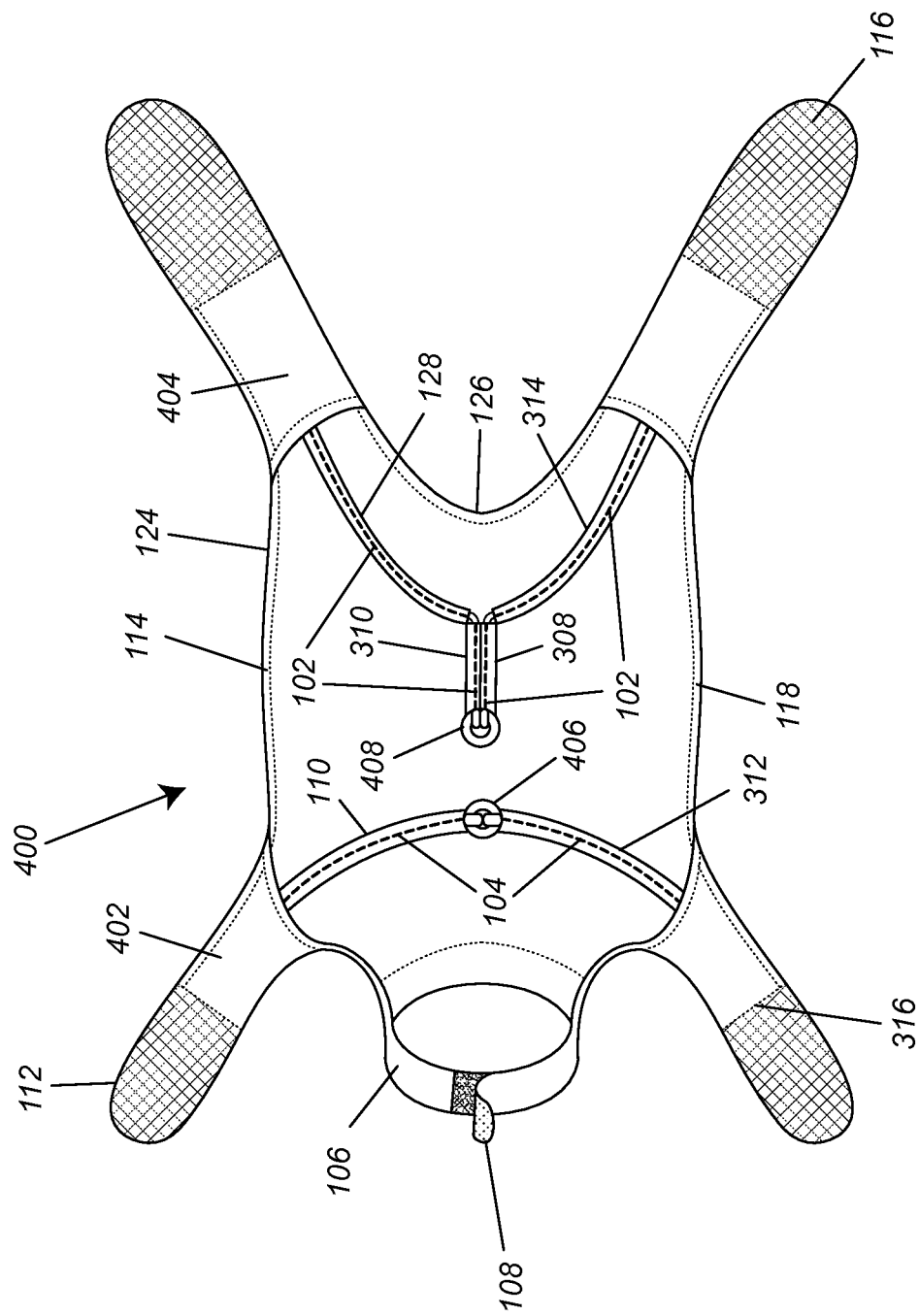
FIG. 4 is an illustration of an inside portion 400 of the dog garment.

As illustrated with FIGS. 3 and 4, the center of the front leg elastic drawstring cord 104 and a hind leg elastic drawstring cord 102 is pulled through a front leg aperture 406 and a hind leg aperture 408, respectively. Then, the center of the front leg elastic drawstring cord 104 and a hind leg elastic drawstring cord 102 is pulled through a front leg aperture 406 and a hind leg aperture 408 and pulled through a front leg toggle clasp 304 and a hind leg toggle clasp 302. Moreover, the elasticity of the front leg elastic drawstring cord 104 and a hind leg elastic drawstring cord 102 as couple with the apertures and toggle clasps allows the user to adjust the size of the dog garment by pulling a drawstring or releasing an amount of a length of drawstring and holding in place with a toggle clasp against an aperture. In this manner and consistent with the drawings, the garment with the adjustable elasticity of the drawstring cords allows for the garment to fit contours of the dog's body in about a skin tight fashion. Moreover, the elasticity of the drawstring cords allows for the garment to move and stretch with the contours of a dog's body, much like a fleece bodysuit for a dog.

In some embodiments, the dog garment further comprises that each terminal end of the front leg elastic drawstring cord are independently attached to each front leg portion of an inside portion of the dog garment and slideably encased in a left front leg drawstring tube and a right front leg drawstring tube. In some embodiments, the dog garment further comprises that each terminal end of the front leg elastic drawstring cord are independently attached to each front leg portion of an inside portion of the dog garment and slideably encased in a left front leg drawstring tube and a right front leg drawstring tube, wherein each front leg drawstring tube extends generally parallel with each leg portion to a center portion of the torso portion, and wherein a center portion of the front leg elastic drawstring cord is pulled from an inside portion through a front leg aperture located generally in the center portion of the torso portion to an outside portion of the torso portion. In some embodiments, the dog garment further comprises that each terminal end of the front leg elastic drawstring cord are independently attached to each front leg portion of an inside portion of the dog garment and slideably encased in a left front leg drawstring tube and a right front leg drawstring tube, wherein each front leg drawstring tube extends generally parallel with each leg portion to a center portion of the torso portion, wherein a center portion of the front leg elastic drawstring cord is pulled from an inside portion through a front leg aperture located generally in the center portion of the torso portion to an outside portion of the torso portion, and wherein the center portion of the front leg elastic drawstring cord is pulled through a toggle clasp, and wherein a size adjustment is accomplished via the drawstring cord being pulled or released at different lengths through the front leg aperture.

In some embodiments, the dog garment further comprises that each terminal end of the hind leg elastic drawstring cord are independently attached to each hind leg portion of an inside portion of the dog garment and slideably encased in a left hind leg drawstring tube and a right hind leg drawstring tube. In some embodiments, the dog garment further comprises that each terminal end of the hind leg elastic drawstring cord are independently attached to each hind leg portion of an inside portion of the dog garment and slideably encased in a left hind leg drawstring tube and a right hind leg drawstring tube, wherein each hind leg drawstring tube extends generally parallel with each leg portion to a center portion of the torso portion, and wherein a center portion of the hind leg elastic drawstring cord is pulled from an inside portion through a hind leg aperture located generally in the center portion of the torso portion to an outside portion of the torso portion. In some embodiments, the dog garment further comprises that each terminal end of the hind leg elastic drawstring cord are independently attached to each hind leg portion of an inside portion of the dog garment and slideably encased in a left hind leg drawstring tube and a right hind leg drawstring tube, wherein each hind leg drawstring tube extends generally parallel with each leg portion to a center portion of the torso portion, wherein a center portion of the hind leg elastic drawstring cord is pulled from an inside portion through a hind leg aperture located generally in the center portion of the torso portion to an outside portion of the torso portion, and wherein the center portion of the hind leg elastic drawstring cord is pulled through a toggle clasp, and wherein a size adjustment is accomplished via the drawstring cord being pulled or released at different lengths through the hind leg aperture.

Referring to the drawings, FIGS. 3 and 4 illustrate a left torso drawstring tube 310 and a right torso drawstring tube 308, which are attached to an inner portion 400 of the dog garment in a parallel position and adjacent to each other running from the left hind leg drawstring tube 128 and a right hind leg drawstring tube 314, respectively, to a hind leg aperture 408. The terminal ends of the hind leg elastic drawstring cord 102 are connected to an inner side 400 of the dog garment with one or more stitches 306 and slideably encased in the left hind leg drawstring tube 128 and the right hind leg drawstring tube 314 and a corresponding left torso drawstring tube 310 and a right torso drawstring tube 308, respectively. The left hind leg drawstring tube 128 and a right hind leg drawstring tube 314, the left torso drawstring tube 310 and the right torso drawstring tube 308 are fastened to an inner side 400 of the dog garment with stitching 120. In some embodiments, the left hind leg drawstring tube 128 and a right hind leg drawstring tube 314 are comprised of polyester, nylon, cotton, fleece, Goretex® or a combination thereof. In some embodiments, the dog garment further comprises that each terminal end of the hind leg elastic drawstring cord are independently attached to each hind leg portion of an inside portion of the dog garment and slideably encased in a left hind leg drawstring tube and a right hind leg drawstring tube and slideably encased in a left torso drawstring tube and a right torso drawstring tube, wherein the left torso drawstring tube and a right torso drawstring tube are parallel and adjacent to each other and located generally in the center portion of the torso portion running from the left hind leg drawstring tube and a right hind leg drawstring tube, wherein a center portion of the hind leg elastic drawstring cord is pulled from an inside portion through a hind leg aperture located generally in the center portion of the torso portion to an outside portion of the torso portion, and wherein the center portion of the hind leg elastic drawstring cord is pulled through a toggle clasp, and wherein a size adjustment is accomplished via the drawstring cord being pulled or released at different lengths through the hind leg aperture.

FIGS. 1-4 illustrate that dog garments 100 and 200 do not cover an underbelly of the dog. Therefore, the underbelly of a dog is exposed to allow the dogs 134 and 202 have optimal movement. FIG. 4 also illustrates that the dog garment comprises inner front leg portions 402 and inner hind leg portions 404. The combination of the open inner side 400 of the dog garment and the inner front leg portions 402 and inner hind leg portions 404 allow for ease in donning the garment on a dog. In some embodiments, the dog garment further comprises inner front leg portions and inner hind leg portions. In some embodiments, the dog garment further comprises inner front leg portions and inner hind leg portions, wherein the inner front leg portions and inner hind leg portions and underbelly opening allow for ease of a user donning a dog with the garment. The dog owner may overlay the dog garment on the back of the dog and conveniently place each leg into each a corresponding leg portions and corresponding foot portions and make any needed size adjustment with the size adjustment portions comprising the front leg elastic drawstring cord 104 and a hind leg elastic drawstring cord 102 against the front leg aperture 406 and the hind leg aperture 408 and the front leg toggle clasp 304 and a hind leg toggle clasp 302, respectively. In this manner, the length of the drawstring cords is adjusted to allow the elasticity of the drawstring cords to pull the leg portions and corresponding foot portions towards the torso of the dog, thereby providing an adjustment that allows the dog garment via the elasticity of the drawstring cords to fit the contours of the dog during movement and while remaining stationary.

FIGS. 1-4 illustrates that dog garments 100 and 200 also cover hind feet pads 116 and front feet pads 112. In this aspect, dog garments 100 and 200 provide thermal insulation and a waterproof barrier for the hind feet pads 116 and front feet pads 112. The hind feet pads 116 and front feet pads 112 are comprised of rubber, foam, polyester, nylon, Goretex® or a combination thereof. In certain embodiments, dog garments 100 and 200 may be made of more than one material, such as when the portion of the garment covering the pads of the dog's feet are made of a non-skid material that provides greater waterproof protection than other areas of the garment. Alternatively, when it is desirable to provide greater waterproof protection for the dog's feet and/or feet pads, a second layer of materials may be added to those portions of the dog garment. In some embodiments, the hind feet pads 116 and front feet pads 112 comprise a nonskid, freeze resistant and waterproof material. In some embodiments, the hind feet pads 116 and front feet pads 112 each encase each foot on the top, bottom, front, rear and sides of the foot.

FIGS. 1-4 illustrates that dog garments 100 and 200 for example, showing a dog garment for a small dog 134 and a large dog 202. In some embodiments, the dog garment further comprises a length between the neck portion and the hind opening is between about 9 inches and 36 inches and a width between about 7 inches to 28 inches. In some embodiments, a length of the leg portions is between about 6 inches and 18 inches. In some embodiments, the dog garment for a small dog has a length of the leg portions of between about 6 inches and 8 inches. In some embodiments, the dog garment for a small dog has a length between the neck portion and the hind opening of between about 9 inches and 12 inches and a width between about 7 inches to 12 inches. In some embodiments, the dog garment for a medium dog has a length of the leg portions of between about 8 inches and 10 inches. In some embodiments, the dog garment for a medium dog has a length between the neck portion and the hind opening of between about 12 inches and 14 inches and a width between about 12 inches to 14 inches. In some embodiments, the dog garment for a large dog has a length of the leg portions of between about 10 inches and 18 inches. In some embodiments, the dog garment for a large dog has a length between the neck portion and the hind opening of between about 14 inches and 36 inches and a width between about 14 inches to 28 inches.

The presently disclosed dog garment is not to be limited in scope by the specific embodiments described herein, which are intended as single illustrations of individual aspects of the presently disclosed devices and methods, and functionally equivalent devices, methods and components are within the scope of the presently disclosed dog garments. Indeed, various modifications of the presently disclosed dog garments, in addition to those shown and described herein will become apparent to those skilled in the art from the foregoing description and accompanying drawings. Such modifications are intended to fall within the scope of the appended claims.

What is claimed is:

1. A dog garment comprising:
   (a) a torso portion that substantially covers a back and lateral sides of a torso of a dog, wherein the torso portion has an underbelly torso opening and a hind opening;
   (b) a neck portion extending from said torso portion and arranged to encase the neck of the dog, wherein the neck portion comprises a neck portion fastener for securing the neck portion;
   (c) front leg portions extending from the torso portion, wherein the front leg portions encase front legs of the dog;
   (d) hind leg portions extending from said torso portion, wherein the hind leg portions encase hind legs of the dog;
   (e) a foot portion at each of a terminal end of the front leg portions and the hind leg portions; and
   (f) size adjustment portions comprising a front leg elastic drawstring cord and a hind leg elastic drawstring cord, wherein the front leg elastic drawstring cord and hind leg elastic drawstring cord are capable of being independently adjusted to accommodate dogs of different sizes, wherein each terminal end of the hind leg elastic drawstring cord are independently attached to each hind leg portion of an inside portion of the dog garment and slideably encased in a left hind leg drawstring tube and a right hind leg drawstring tube and slideably encased in a left torso drawstring tube and a right torso drawstring tube, wherein the left torso drawstring tube and a right torso drawstring tube are parallel and adjacent to each other and located generally in the center portion of the torso portion running from the left hind leg drawstring tube and a right hind leg drawstring tube, wherein a center portion of the hind leg elastic drawstring cord is pulled from an inside portion through a hind leg aperture located generally in the center portion of the torso portion to an outside portion of the torso portion, and wherein the center portion of the hind leg elastic drawstring cord is pulled through a toggle clasp, and wherein a size adjustment is accomplished via the drawstring cord being pulled or released at different lengths through the hind leg aperture.

2. The dog garment of claim 1, wherein the front leg elastic drawstring cord and the hind leg elastic drawstring cord are each comprised of an elastic rubber, wherein the terminal ends of each cord are fastened to the leg portions.

3. The dog garment of claim 1, wherein the front leg elastic drawstring cord and the hind leg elastic drawstring cord are each comprised of an elastic rubber, wherein the terminal ends of each cord are fastened to the leg portions, wherein the fastener comprises a staple, glue, stitching, or combinations thereof.

4. The dog garment of claim 1, further comprising that the front leg elastic drawstring cord and the hind leg elastic drawstring cord are capable of stretching up to about 5 times their length and are capable of stretching the garment over a torso and legs of the dog.

5. The dog garment of claim 1, further comprising that each terminal end of the front leg elastic drawstring cord are independently attached to each front leg portion of an inside portion of the dog garment and slideably encased in a left front leg drawstring tube and a right front leg drawstring tube.

6. The dog garment of claim 1, further comprising that each terminal end of the front leg elastic drawstring cord are independently attached to each front leg portion of an inside portion of the dog garment and slideably encased in a left front leg drawstring tube and a right front leg drawstring tube, wherein each front leg drawstring tube extends generally parallel with each leg portion to a center portion of the torso portion, and wherein a center portion of the front leg elastic drawstring cord is pulled from an inside portion through a front leg aperture located generally in the center portion of the torso portion to an outside portion of the torso portion.

7. The dog garment of claim 1, further comprising that each terminal end of the front leg elastic drawstring cord are independently attached to each front leg portion of an inside portion of the dog garment and slideably encased in a left front leg drawstring tube and a right front leg drawstring tube, wherein each front leg drawstring tube extends generally parallel with each leg portion to a center portion of the torso portion, wherein a center portion of the front leg elastic drawstring cord is pulled from an inside portion through a front leg aperture located generally in the center portion of the torso portion to an outside portion of the torso portion, and wherein the center portion of the front leg elastic drawstring cord is pulled through a toggle clasp, and wherein a size adjustment is accomplished via the drawstring cord being pulled or released at different lengths through the front leg aperture.

8. The dog garment of claim 1, wherein the neck portion comprises an elastic material.

9. The dog garment of claim 1, further comprising a leash attachment opening located on the neck portion of the dog garment.

10. The dog garment of claim 1, wherein the neck portion fastener comprises a hook-and-loop fastener, a snap, a clip, a button or a combination thereof.

11. The dog garment of claim 1, wherein the dog garment comprises one continuous piece of thermally insulating material.

12. The dog garment of claim 1, further comprising inner front leg portions and inner hind leg portions.

13. The dog garment of claim 1, further comprising inner front leg portions and inner hind leg portions, wherein the inner front leg portions and inner hind leg portions and underbelly opening allow for ease of a user donning a dog with the garment.

14. The dog garment of claim 1, wherein the dog garment comprises a thermally insulating, machine washable and dryable fleece material.

15. The dog garment of claim 1, comprising a length between the neck portion and the hind opening is between about 9 inches and 36 inches and a width between about 7 inches to 28 inches.

16. The dog garment of claim 1, wherein a length of the leg portions is between about 6 inches and 18 inches.

* * * * *